US011890863B2

(12) United States Patent
Condello et al.

(10) Patent No.: US 11,890,863 B2
(45) Date of Patent: Feb. 6, 2024

(54) AIRFLOW CONTROL THROUGH VACUUM PLATEN OF A PRINTING SYSTEM, AND RELATED DEVICES, SYSTEMS, AND METHODS

(71) Applicant: XEROX CORPORATION, Norwalk, CT (US)

(72) Inventors: Anthony Salvatore Condello, Webster, NY (US); Peter John Knausdorf, Henrietta, NY (US); Jack T. Lestrange, Macedon, NY (US); Palghat S. Ramesh, Pittsford, NY (US); Joseph C. Sheflin, Macedon, NY (US)

(73) Assignee: XEROX CORPORATION, Norwalk, CT (US)

( * ) Notice: Subject to any disclaimer, the term of this patent is extended or adjusted under 35 U.S.C. 154(b) by 41 days.

(21) Appl. No.: 17/218,849

(22) Filed: Mar. 31, 2021

(65) Prior Publication Data

US 2022/0314651 A1 Oct. 6, 2022

(51) Int. Cl.

| | |
|---|---|
| ***B41J 11/00*** | (2006.01) |
| ***B41J 11/06*** | (2006.01) |
| ***B65H 5/04*** | (2006.01) |
| ***B65H 5/22*** | (2006.01) |

(52) U.S. Cl.

CPC .......... *B41J 11/0085* (2013.01); *B41J 11/007* (2013.01); *B41J 11/06* (2013.01); *B65H 5/04* (2013.01); *B65H 5/222* (2013.01)

(58) Field of Classification Search

None

See application file for complete search history.

(56) References Cited

U.S. PATENT DOCUMENTS

| | | | | |
|---|---|---|---|---|
| 8,388,246 | B2 | 3/2013 | Spence et al. | |
| 9,944,094 | B1 | 4/2018 | Herrmann et al. | |
| 10,688,778 | B2 | 6/2020 | Fromm et al. | |
| 2001/0046401 | A1* | 11/2001 | Lien | B41J 2/355 400/240.4 |

(Continued)

FOREIGN PATENT DOCUMENTS

| | | | |
|---|---|---|---|
| CN | 1517229 | A | 12/2006 |
| EP | 1 319 510 | B1 | 9/2009 |
| GB | 2 374 834 | A | 10/2002 |

OTHER PUBLICATIONS

Co-Pending U.S. Application 17/218,887, "Airflow Control via Airflow Zones in Vacuum Plenum of a Printing System, and Related Devices, Systems, and Methods,", filed Mar. 31, 2021.

*Primary Examiner* — Justin Seo
*Assistant Examiner* — Tracey M McMillion
(74) *Attorney, Agent, or Firm* — Jones Robb, PLLC

(57) ABSTRACT

A printing system comprises an ink deposition assembly and a media transport device. The ink deposition assembly comprises printheads to deposit a print fluid, such as ink, on print media, such as paper. The media transport device holds the print media against a movable support surface, such as a belt, by vacuum suction platen and transports the print media though a deposition region. The vacuum suction is communicated to the movable through platen holes and platen channels in a vacuum platen. At least some of the platen channels have a high impedance region that has a reduced open cross-sectional area as compared to another region of the platen channel.

17 Claims, 15 Drawing Sheets

(56) References Cited

U.S. PATENT DOCUMENTS

| | | | | |
|---|---|---|---|---|
| 2001/0046404 | A1* | 11/2001 | Wotton | B65H 5/224 400/578 |
| 2005/0095046 | A1* | 5/2005 | Beehler | B41J 11/06 400/23 |
| 2011/0242220 | A1* | 10/2011 | Yamagishi | B41J 11/0085 347/47 |
| 2015/0273876 | A1 | 10/2015 | Soda et al. | |

* cited by examiner

AIRFLOW CONTROL THROUGH VACUUM PLATEN OF A PRINTING SYSTEM, AND RELATED DEVICES, SYSTEMS, AND METHODS

FIELD

Aspects of this disclosure relate generally to inkjet printing, and more specifically to inkjet printing systems having a media transport assembly utilizing vacuum suction to hold and transport print media. Related devices, systems, and methods also are disclosed.

INTRODUCTION

In some applications, inkjet printing systems use an ink deposition assembly with one or more printheads, and a media transport assembly to move print media (e.g., a substrate such as sheets of paper, envelopes, or other substrate suitable for being printed with ink) through an ink deposition region of the ink deposition assembly (e.g., a region under the printheads). The inkjet printing system forms printed images on the print media by ejecting ink from the printheads onto the media as the media pass through the deposition region. In some inkjet printing systems, the media transport assembly utilizes vacuum suction to assist in holding the print media against a movable support surface (e.g., conveyor belt, rotating drum, etc.) of the transport device. Vacuum suction to hold the print media against the support surface can be achieved using a vacuum source (e.g., fans) and a vacuum plenum fluidically coupling the vacuum source to a side of the movable support surface opposite from the side that supports the print medium. The vacuum source creates a vacuum state in the vacuum plenum, causing vacuum suction through holes in the movable support surface that are fluidically coupled to the vacuum plenum. When a print medium is introduced onto the movable support surface, the vacuum suction generates suction forces that hold the print medium against the movable support surface. The media transport assembly utilizing vacuum suction may allow print media to be securely held in place without slippage while being transported through the ink deposition region under the ink deposition assembly, thereby helping to ensure correct locating of the print media relative to the printheads and thus more accurate printed images. The vacuum suction may also allow print media to be held flat as it passes through the ink deposition region, which may also help to increase accuracy of printed images, as well as helping to prevent part of the print medium from rising up and striking part of the ink deposition assembly and potentially causing a jam or damage.

One problem that may arise in inkjet printing systems that include media transport assemblies utilizing vacuum suction is unintended blurring of images resulting from air currents induced by the vacuum suction. In some systems, such blurring may occur in portions of the printed image that are near the edges of the print media, particularly those portions that are near the lead edge or trail edge in the transport direction (sometimes referred to as process direction) of the print media. During a print job, the print media are spaced apart from one another on the movable support surface as they are transported through the deposition region of the ink deposition assembly, and therefore parts of the movable support surface between adjacent print media are not covered by any print media. This region between adjacent print media is referred to herein as the inter-media zone. Thus, adjacent to both the lead edge and the trail edge of each print medium in the inter-media zone there are uncovered holes in the movable support surface. Because these holes are uncovered, the vacuum of the vacuum plenum induces air to flow through those uncovered holes. This airflow may deflect ink droplets as they are traveling from a printhead to the substrate, and thus cause blurring of the image.

A need exists to improve the accuracy of the placement of droplets in inkjet printing systems and to reduce the appearance of blur of the final printed media product. A need further exists to address the blurring issues in a reliable manner and while maintaining speeds of printing and transport to provide efficient inkjet printing systems.

SUMMARY

Embodiments of the present disclosure may solve one or more of the above-mentioned problems and/or may demonstrate one or more of the above-mentioned desirable features. Other features and/or advantages may become apparent from the description that follows.

In accordance with at least one embodiment of the present disclosure, a printing system, comprises an ink deposition assembly and a media transport assembly. The ink deposition assembly comprises a printhead arranged to eject a print fluid to a deposition region of the ink deposition assembly. The media transport assembly comprises a vacuum source, a vacuum platen comprising platen holes fluidically coupled to corresponding platen channels, and a movable support surface movable in a process direction. The media transport assembly configured hold a print medium against the movable support surface by vacuum suction communicated from the vacuum source through the platen holes and platen channels to transport the print medium through the deposition region. At least some of the platen channels comprise a first region and a second region having a reduced open cross-sectional area relative to the first region, the second region being at a location between the first region and a platen hole fluidically coupled to the respective platen channel.

In accordance with at least one embodiment of the present disclosure, vacuum platen for a media transport device of a printing system comprises a platen body; a plurality of platen channels in the platen body, each of the platen channels opening to a first side of the platen body; and a plurality of platen holes in the platen body, each the platen holes opening to a second side of the platen body, opposite the first side, and being fluidically coupled to one of the platen channels. At least some of the platen channels comprise a first region and a second region having a reduced open cross-sectional area relative to the first region, the second region being at a location between the first region and a platen hole fluidically coupled to the respective platen channel.

In accordance with at least one embodiment of the present disclosure, A method, comprises loading a print medium onto a movable support surface of a media transport assembly of a printing system; holding the print medium against the movable support surface via vacuum suction through platen holes and platen channels in a vacuum platen, flowing air from a first region of a given platen channel of the platen channels through a second region of the given platen channel to one of the platen holes, an open cross-sectional area of the second region being reduced relative to the first region; transporting the print medium, by moving the movable support surface relative to the vacuum platen, in a process direction through a deposition region of a printhead of the printing system; and ejecting print fluid from the printhead to deposit the print fluid to the print medium in the deposition region.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more embodiments of the present teachings and together with the description explain certain principles and operation. In the drawings.

DETAILED DESCRIPTION

In the Figures and the description herein, numerical indexes such as "_1", "_2", etc. are appended to the end of the reference numbers of some components. When there are multiple similar components and it is desired to refer to a specific one of those components, the same base reference number is used and different indexes are appended to it to distinguish individual components. However, when the components are being referred to generally or collectively without a need to distinguish between specific ones, the index may be omitted from the base reference number. Thus, as one example, a print medium 5 may be labeled and referred to as a first print medium 5_1 when it is desired to identify a specific one of the print media 5, as in FIG. 1A, but it may also be labeled and referred to as simply a print medium 5 in other cases in which it is not desired to distinguish between multiple print media 5.

Figure 1A:
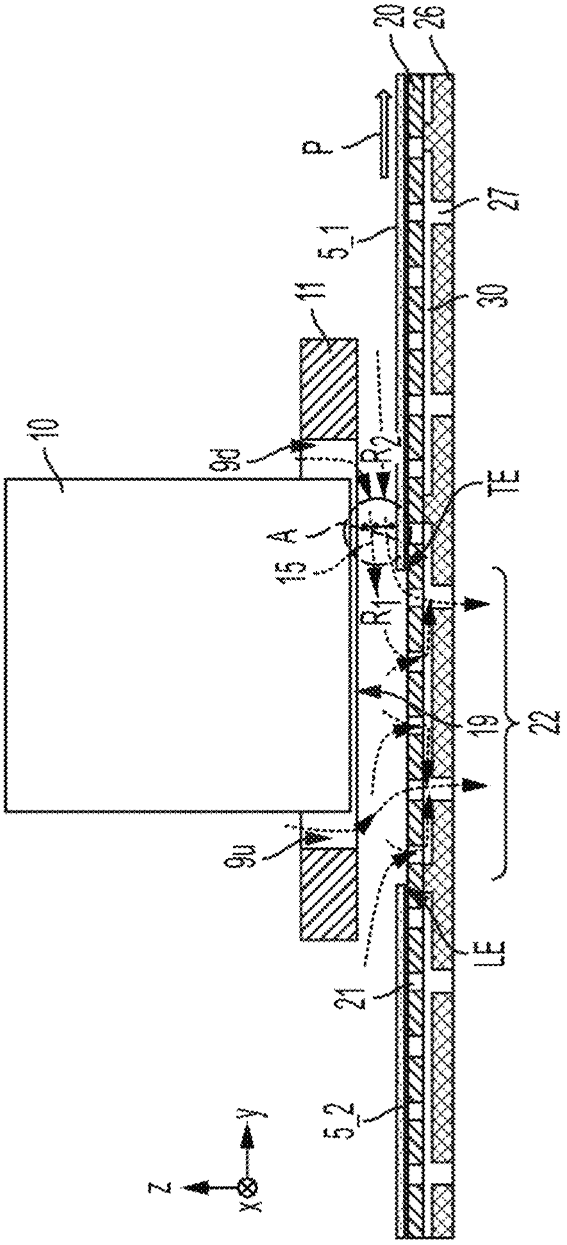
FIG. 1A RELATED ART
FIGS. 1A-1I schematically illustrate air flow patterns relative to a printhead assembly, transport device, and print media during differing stages of print media transport through an ink deposition region of a conventional inkjet printing system, and resulting blur effects in the printed media product.
Figure 1B:
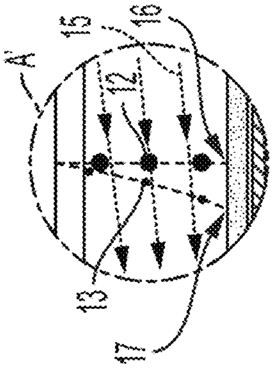
Figure 1C:
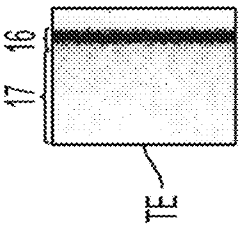
Figure 1D:
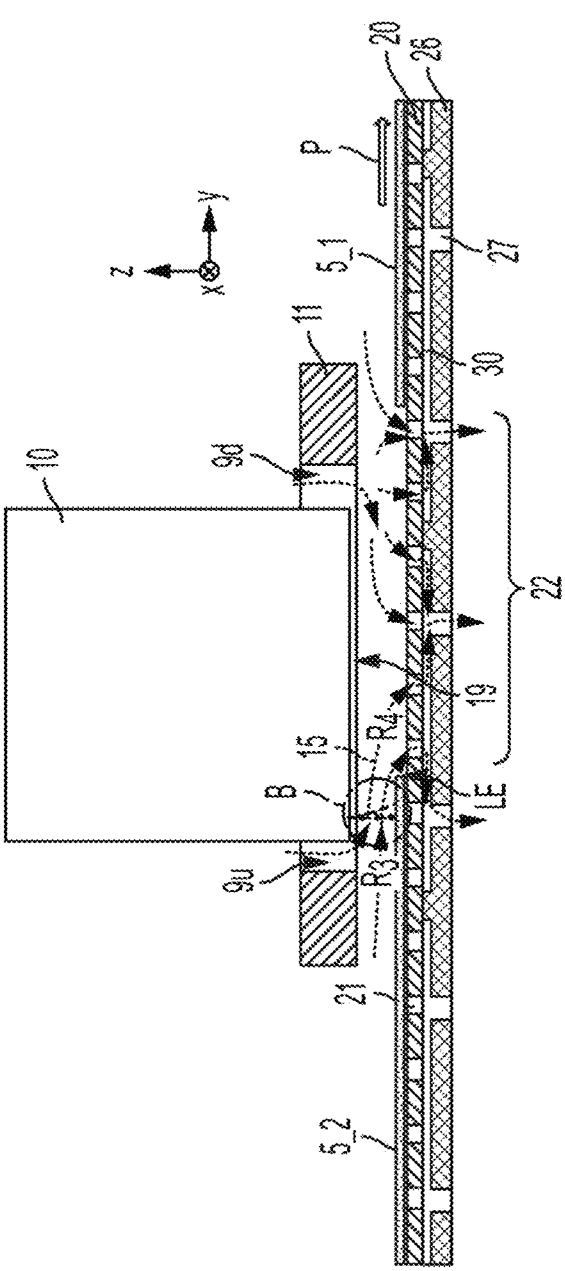
FIG. 1D RELATED ART
Figure 1E:
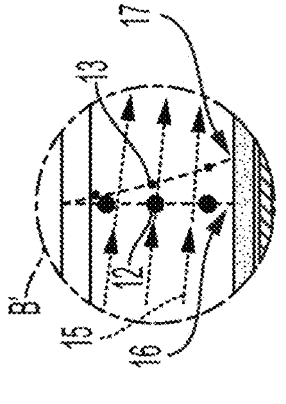
Figure 1F:
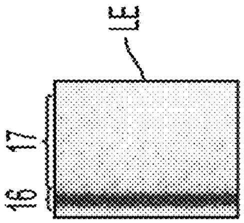
Figure 1G:
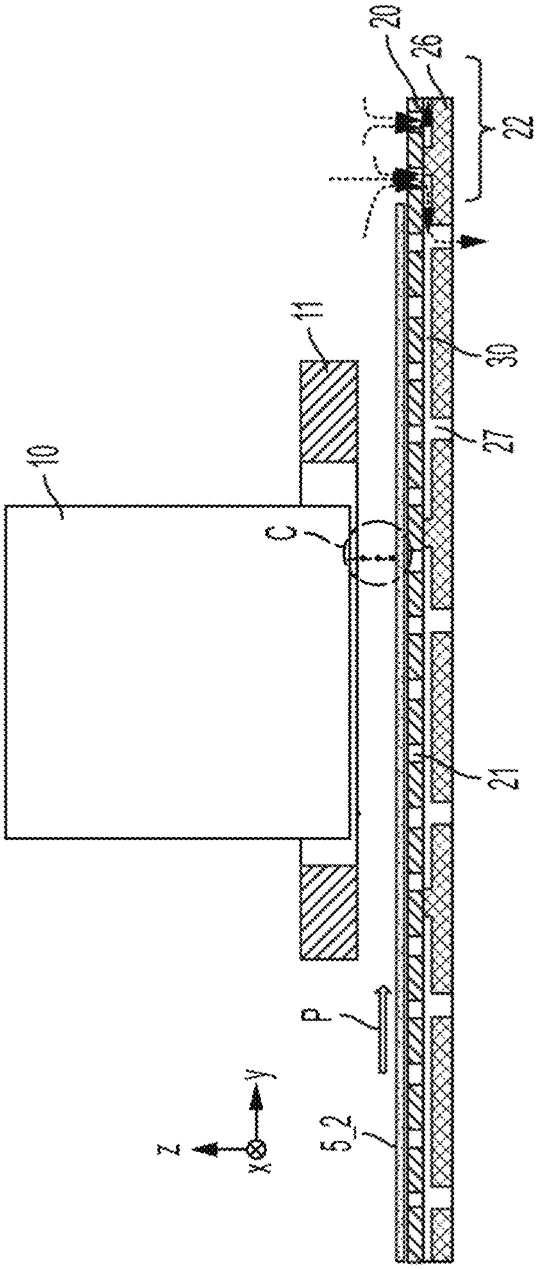
FIG. 1G RELATED ART
Figure 1I:
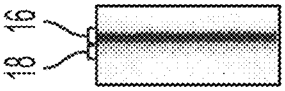
Figure 1H:
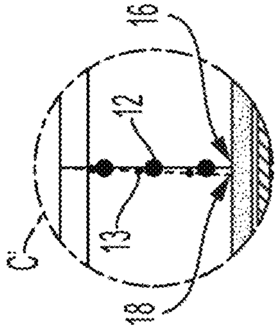

As described above, when an inter-media zone is near or under a printhead, the uncovered holes in the inter-media zone can create crossflows that can blow ink droplets ejected from a printhead off course and cause image blur. To better illustrate some of the phenomena occurring giving rise to the blurring issues, reference is made to FIGS. 1A-1I. FIGS. 1A, 1D, and 1G illustrate schematically a printhead 10 printing on a print medium 5 near a trail edge TE, a lead edge LE, and a middle, respectively, of the print medium 5. FIGS. 1A, 1D, and 1G are cross-sections taken through one of the printheads 10 along a process direction (y-axis direction in the figures). FIGS. 1B, 1E, and 1H illustrate enlarged views of the regions A, B, and C, of FIGS. 1A, 1D, and 1G, respectively. FIGS. 1C, 1F, and 1I illustrate enlarged pictures of printed images, the printed images comprising lines printed near the trail edge TE, lead edge LE, and middle portion, respectively, of a sheet of paper.

As shown in FIGS. 1A, 1D, and 1G, the inkjet printing system comprises one or more printheads 10 to eject ink to print media 5 (e.g., leading or downstream print medium 5_1 and trailing or upstream print medium 5_2) through printhead openings 19 in a carrier plate 11, and a movable support surface 20 that transports the print media 5 in a process direction P, which corresponds to a positive y-axis direction in the Figures. The movable support surface 20 is movable (e.g., slides) along a top of a vacuum platen 26, and a vacuum environment is provided on a bottom side of the platen 26. The vacuum platen 26 has platen holes 27 fluidically coupled to corresponding platen channels 30, with the platen holes 27 opening to and in fluidic communication with the vacuum environment below the platen 26 and the platen channels 30 opening to and in fluidic communication with the region above the platen 26. Thus, the platen holes 27 and platen channels 30 communicate vacuum suction to the bottom side of the movable support surface. The platen channels 30 extend in the process direction P, and each may be coupled to one or multiple holes 27. The movable support surface 20 has holes 21, with each hole 21 periodically aligning vertically (i.e., in the z-axis direction) with platen channels 30 as the movable support surface 20 moves along the process direction P and relative to the platen 26. Thus, when one of the holes 21 is located over a channel 30, the hole 21 communicates the vacuum suction from the channel 30 to the region above the movable support surface 20. In regions where the print media 5 cover the holes 21, the vacuum suction communicated through the holes 21 (via platen holes 27 and platen channels 30) generates a force that holds the print media 5 against the movable support surface 20. Little or no air flows through these covered holes 21 from the environment above the moveable support surface 20 (i.e., the side of the movable support surface 20 opposite the platen 26) due to the holes being blocked by the print media 5. On the other hand, as shown in FIGS. 1A, 1D, and 1G, in the inter-media zone 22 between adjacent print media (e.g., between print media 5_1, 5_2), the holes 21 are not covered by any print media and therefore the vacuum suction pulls air from above the movable support surface 20 to flow into and through the uncovered holes 21. This creates airflows, indicated by the dashed arrows in FIGS. 1A, 1D, and 1G, which flow from regions around the printhead 10 towards the uncovered holes 21 and 27 in the inter-media zone 22. As shown in FIGS. 1A and 1D, when the inter-media zone 22 is near or under a printhead 10, some of the airflows induced by the inter-media zone 22 pass under the printhead 10.

In FIG. 1A, the print medium 5_1 is being printed on near its trail edge TE, and therefore the region where ink is currently being ejected ("ink-ejection region") (e.g., region A in FIG. 1A) is located downstream of the inter-media zone 22 (upstream and downstream being defined with respect to the process direction P, which is the direction of transport of the print media by the movable support surface 20). Accordingly, some of the air being sucked towards the inter-media zone 22 will flow upstream through the ink-ejection region A. More specifically, the vacuum suction from the inter-media zone 22 lowers the pressure in the region immediately above the inter-media zone 22, e.g., region $R_1$ in FIG. 1A, while the region downstream of the printhead 10, e.g., region $R_2$ in FIG. 1A, remains at a higher pressure. This pressure gradient causes air to flow in an upstream direction from the region $R_2$ to the region $R_1$, with the airflows crossing through the ink-ejection region (e.g., region A in FIG. 1A) which is between the regions $R_1$ and $R_2$. Some of this air may be pulled from the gap 9*d* between the downstream face of the printhead 10 and a rim of the opening 19 through which the printhead 10 ejects ink. Airflows such as these, which cross through the ink-ejection region, are referred to herein as crossflows 15. In FIG. 1A, the crossflows 15 flow upstream, but in other situations the crossflows 15 may flow in different directions.

As shown in the enlarged view A' in FIG. 1B, which is an enlarged view of the region A, as ink is ejected from the printhead 10 towards the medium 5, main ink droplets 12 and satellite ink droplets 13 are formed. The satellite droplets 13 are much smaller than the main droplets 12 and have less mass and momentum, and thus the upstream crossflows 15 tend to affect the satellite droplets 13 more than the main droplets 12. Thus, while the main droplets 12 typically will land on the print medium 5 near their intended deposition location 16 regardless of the crossflows 15, the crossflows 15 may push the satellite droplets 13, due to their smaller mass, away from the intended trajectory so that they land at an unintended location 17 on the medium 5, the unintended location 17 being displaced from the intended location 16. The result of this can be seen in an actual printed image in FIG. 1C, in which the denser/darker line-shaped portion is formed by the main droplets which were deposited predominantly at their intended locations 16, whereas the smaller dots dispersed away from the line are formed by satellite droplets which were blown away from the intended locations 16 to land in unintended locations 17, resulting in a blurred or smudged appearance for the printed line. Notably, the blurring in FIG. 1C is asymmetrically biased towards the trail edge TE of the paper shown, which would be due to the crossflows 15 near the trail edge TE blowing primarily in an upstream direction depicted in FIGS. 1A and 1B. The inter-media zone 22 may also induce other airflows flowing in other directions, such as downstream airflows from an upstream side of the printhead 10, but these other airflows do not pass through the region where ink is currently being ejected in the illustrated scenario and thus do not contribute to image blur. Only those airflows that cross through the ink ejection region are referred to herein as crossflows.

FIGS. 1D-1F illustrate another example of such blurring occurring, but this time near the lead edge LE of the print medium 5_2. The cause of blurring near the lead edge LE as shown in FIGS. 1C and 1D is similar to that described above in relation to the trail edge TE, except that in the case of printing near the lead edge LE the ink-ejection region is now located upstream of the inter-media zone 22. As a result, the crossflows 15 that are crossing through the ink-ejection region now originate from the upstream side of the printhead 10, e.g., from region $R_3$, and flow downstream to region $R_4$ where the uncovered holes of the inter-media zone 22 adjacent the lead edge LE are. For example, air may be pulled from the gap 9*u* between the upstream face of the printhead 10 and the rim of the opening 19 of the carrier plate 11. Thus, as shown in the enlarged view B' of FIG. 1E, which comprises an enlarged view of the ink ejection region B, in the case of printing near the lead edge LE, the satellite droplets 13 are blown downstream towards the lead edge LE of the print medium 5_2 (positive y-axis direction). As shown in FIG. 1F, such a phenomenon results in asymmetric blurring that is biased towards the lead edge LE, in which satellite droplets get deposited at undesired locations 17 relative to the intended location 16.

In contrast, as shown in FIG. 1G and the enlarged view C' in FIG. 1H which corresponds to an enlarged view of ink ejection region C, when a print medium (e.g., print medium 5_2) is being printed on in a middle portion, farther from the trail and lead edges TE, LE, there may be little or no crossflows 15 because the inter-media zone 22 is too distant from the printhead 10 and the ink-ejection region D to induce any significant airflow near the ink-ejection region D. Because the crossflows 15 are absent or weak farther away from the edges of the print medium 5, the satellite droplets 13 in this region are not as likely to be blown off course. Thus, as shown in FIG. 1H and 1I, when printing farther from the edges of the print medium 5_2, the satellite droplets land at locations 18 that are much closer to the intended locations 16 resulting in much less image blurring. The deposition locations 18 of the satellite droplets may still vary somewhat from the intended locations 16, due to other factors affecting the satellite droplets, but the deviation is smaller than it would be near the lead or trail edges, thus not resulting in as noticeable blurring.

Embodiments disclosed herein may, among other things, inhibit some of the crossflows so as to reduce the resulting image blur that may occur. By inhibiting crossflows, the droplets ejected from a printhead (including, e.g., the satellite droplets) are more likely to land closer to or at their intended deposition locations, and therefore the amount of blur can be reduced. In accordance with various embodiments, at least some of the platen channels of the vacuum platen comprise one or more regions that provide relatively high impedance to airflow through the channel. Each such "high impedance region" is provided between a platen hole coupled to the channel and another portion of the platen channel. The high impedance regions of the channel can significantly reduce the rate at which air flows through the channel to the platen holes (as compared to a conventional channel without such a high impedance region). This reduces the strength with which air is pulled into the channels when they are located in the inter-media zone, thus reducing the strength of crossflows induced by the inter-media zone. With the crossflows reduced in strength, the ink droplets (including the satellite droplets) are more likely to land at or nearer to their intended deposition locations, and therefore the amount of blur near that edge of the print media is reduced.

Reducing the rate of airflow through the channels also reduces the amount of hold down force that is applied to the print media. But in accordance with various embodiments, as the impedance in the high impedance portion increases, the airflow rate decreases faster than the hold down force decreases. For example, doubling the impedance in a high impedance region of a channel (relative to the impedance of the rest of the channel) may reduce the airflow rate by nearly 50% while only reducing the hold down force by around 25%. Thus, significant reductions in the rate of airflow can be obtained by increasing the impedance at a region of a channel while still maintaining a sufficient hold down force on print media. In some embodiments, the high impedance regions are provided for platen holes that are near a printhead, as these are the platen holes most likely to induce crossflows that produce image blur, and the high impedance regions are omitted elsewhere. In other embodiment, the high impedance regions are provided for additional platen holes, such as for every platen hole.

In various embodiments, a high impedance region is created by providing a channel with a localized region in which the open cross-sectional area of the channel is reduced as compared to the remainder the channel. As used herein, the open cross-sectional area of the channel at a given point refers to the area of the open space within the channel in a transvers cross-section of the channel at that given point. The open cross-sectional area may depend, in part, on the total cross-sectional area of the channel. As used herein, the total cross-sectional area of the channel at a given point refers to the area of the outer profile (i.e., outer boundaries) of the channel in a transverse cross-section of the channel at the given point. As a non-limiting example, if the channel has a rectangular cross-sectional profile at a given point, the total cross-sectional area of the channel at that point is the width of the channel multiplied by the depth (or height) of the channel. The open cross-sectional area may also depend, in part, on the size and shape of any obstruction features (e.g., mesh, sponge, fins, pins, etc.) that happen to be located within the channel at the position where the cross-section is taken. All other things being equal, decreasing the open cross-sectional area of a channel increases its impedance (resistance to airflow).

In addition to depending on the open cross-sectional area of the channel, the impedance of a region of the channel may also depend on other properties of the channel in that region, such as the shape of cross-sectional profile of the channel (different shapes may result in different impedances, even with the same open cross sectional area) and the materials that are used to form the walls and/or obstruction features of the channel (different materials may result in different impedances, all other things being equal). Thus, in various embodiments a high impedance regions is formed, at least in part, by adjusting the shape and/or materials of the channel in a region (as compared to other portions of the channel), in addition to or in lieu of reducing the open cross-sectional area of the channel in the region.

In some embodiments, a high impedance region of a platen channel comprises a necked-down portion of the platen channel in which the total cross-sectional area of the channel (as defined above) is smaller than the total cross-sectional area of the channel in other portions of the channel. Specifically, in some embodiments a width of the channel in the cross-process direction is smaller in the necked-down portion than in a remainder of the channel. In such embodiments, the relatively wider width in the remainder of the channel allows the size of the top opening of the channel (the opening that faces the movable support surface) to remain relatively large throughout most of the channel. This larger opening may allow for a greater area of overlap between the opening and the holes in the movable support surface as the holes moving over the channel, and this greater area of overlap results in increased hold down force being applied to the print media.

In some embodiments, a high impedance region of a platen channel comprises a portion of the channel in which an obstruction feature has been added within the channel so as reduce the open cross-sectional area of the channel in that region and obstruct air flow, resulting in an increase in the impedance of the channel. An obstruction feature can be any structure or collection of structures that comprise portions that block or impede airflow and thus reduce the open cross-sectional area of channel when disposed in the channel, resulting in an increase of the airflow impedance through the channel while not necessarily completely stopping airflow through the channel. Examples of obstruction features include, but are not limited to, fins (e.g., skived fins), pins, a pin-fin array, a mesh screen (e.g., a wire mesh), a porous material (a filter, a sponge, steel wool, foam, fabric, etc.), a series of baffles, sintering or other roughening elements adhered to the side walls of the channel, a wall with one or more apertures disposed across the channel, etc. Those having ordinary skill in the art would appreciate that the obstruction features listed above are nonlimiting and that other types of structures could be used to provide a reduced open cross-sectional area of the channel and achieve the desired impedance to airflow consistent with the principles of operation disclosed herein.

Figure 2:
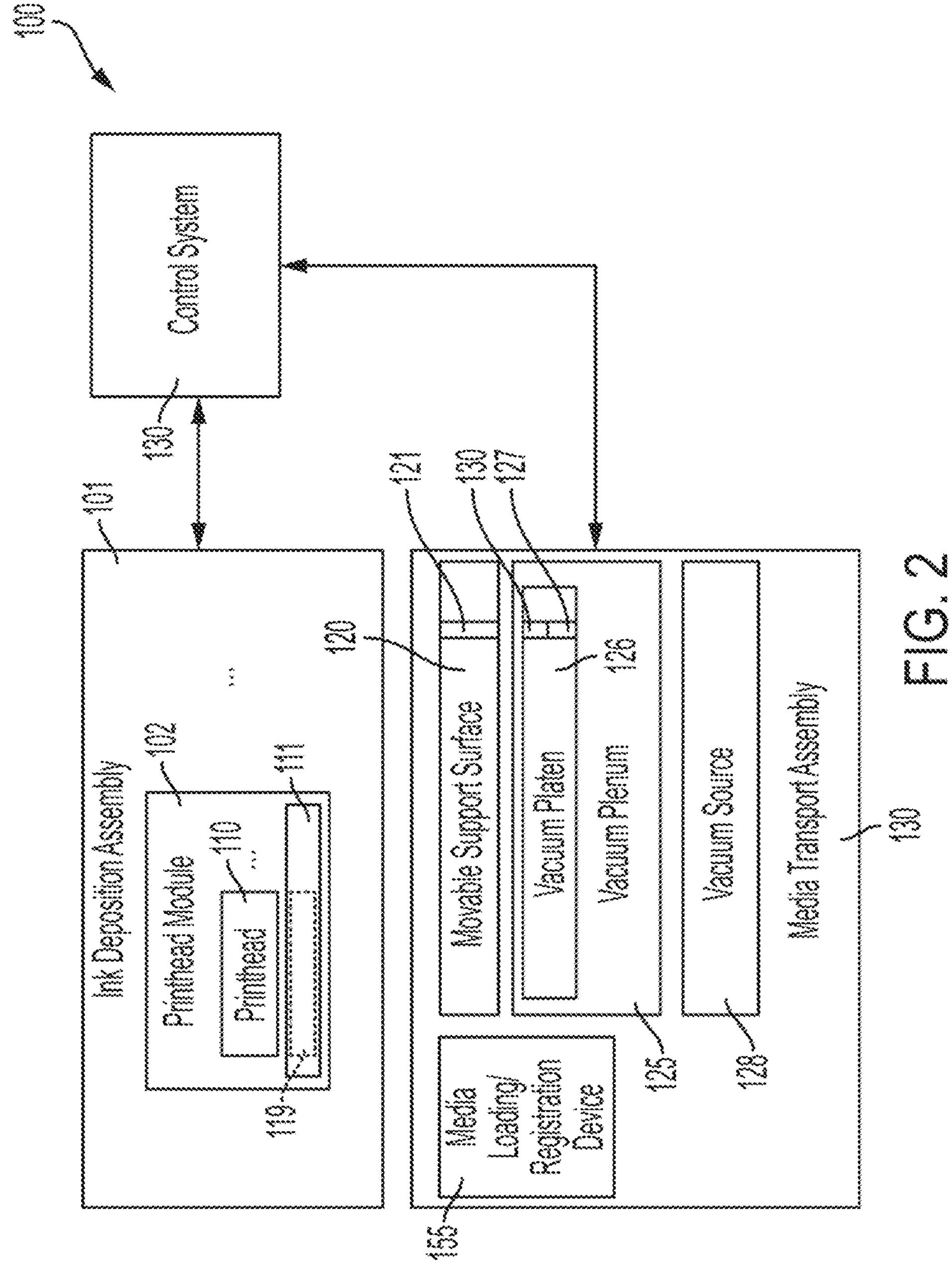
FIG. 2 is a block diagram illustrating components of an embodiment of an inkjet printing system including an air flow control system.

Turning now to FIG. 2, an embodiment of a printing system will be described in greater detail. FIG. 2 is a block diagram which schematically illustrates a printing system 100 utilizing the above-described channels having in high impedance regions. The printing system 100 comprises an ink deposition assembly 101 to deposit ink on print media, a media transport assembly 103 to transport print media through the ink deposition assembly 101, and a control system 135 to control operations of the printing system 100.

The ink deposition assembly 101 comprises one or more printhead modules 102. One printhead module 102 is illustrated in FIG. 2 for simplicity, but any number of printhead modules 102 may be included in the ink deposition assembly 101. In some embodiments, each printhead module 102 may correspond to a specific ink color, such as cyan, magenta, yellow, and black. Each printhead module 102 comprises one or more printheads 110 configured to eject print fluid, such as ink, onto the print media to form an image. In FIG. 2, one printhead 110 is illustrated in the printhead module 102 for simplicity, but any number of printheads 110 may be included per printhead module 102. The printhead modules 102 may comprise one or more walls, including a bottom wall which may be referred to herein as a carrier plate 111. The carrier plate 111 comprises printhead openings 119, and the printheads 110 are arranged to eject their ink through the printhead openings 119. In some embodiments, the carrier plate 111 supports the printheads 110. In other embodiments, the printheads 110 are supported by other structures. The printhead modules 102 may also include additional structures and devices to support and facilitate operation of the printheads 110, such as, ink supply lines, ink reservoirs, electrical connections, and so on, as known by those of ordinary skill in the art.

As shown in FIG. 2, the media transport assembly 103 comprises a movable support surface 120, a vacuum plenum 125 (which comprises a vacuum platen 126), a vacuum source 128, and a media loading/registration device 155.

The movable support surface 120 transports the print media through a deposition region of the ink deposition assembly 101. The vacuum plenum 125 supplies vacuum suction from the vacuum source 128 to one side of the movable support surface 120 (e.g., a bottom side), and print media is supported on an opposite side of the movable support surface 120 (e.g., a top side). Holes 121 through the movable support surface 120 communicate the vacuum suction through the surface 120, such that the vacuum suction holds down the print media against the surface 120. The media loading/registration device 155 loads the print media onto the movable support surface 120 and registers the print media.

The movable support surface 120 is movable relative to the ink deposition assembly 101, and thus the print media held against the movable support surface 120 is transported relative to the ink deposition assembly 101 as the movable support surface 120 moves. Specifically, the movable support surface 120 transports the print media through a deposition region of the ink deposition assembly 101, the deposition region being a region in which print fluid (e.g., ink) is ejected onto the print media, such as a region under the printhead(s) 110. The movable support surface 120 can comprise any structure capable of being driven to move relative to the ink deposition assembly 101 and which has holes 121 to allow the vacuum suction to hold down the print media, such as a belt, a drum, etc.

The vacuum plenum 125 comprises baffles, walls, or any other structures arranged to enclose or define an environment in which a vacuum state (e.g., low pressure state) is maintained by the vacuum source 128, with the plenum 125 fluidically coupling the vacuum source 128 to the movable support surface 120 such that the movable support surface 120 is exposed to the vacuum state within the vacuum plenum 125. The vacuum plenum 125 comprises a vacuum platen 126, which forms a top wall of the vacuum plenum 125 and supports the movable support surface 120. The vacuum platen 126 comprises a platen body and platen holes 127 and platen channels 130 in the platen body. The movable support surface 120 is fluidically coupled to the vacuum in the plenum 125 via the platen holes 127 and platen channels 130 through the vacuum platen 126. The vacuum source 128 may be any device configured to remove air from the plenum 125 to create the low-pressure state in the plenum 125, such as a fan, a pump, etc.

The platen holes 127 and platen channels 130 are arranged in columns that extend in the process direction, the columns being distributed across the vacuum platen 126 in the cross-process direction. Each column may have a plurality of platen holes 127 and platen channels 130 in it, with a longitudinal dimension of the channels 130 oriented in the process-direction. The holes 121 in the movable support surface 120 (also referred to herein as "belt holes" in embodiments in which the movable support surface comprises a belt) are positioned in the process direction to align with corresponding columns of platen channels 130, and thus as the movable support surface 120 moves relative to the vacuum platen 126, each respective hole 121 moves sequentially over each of the plurality of platen channels 130 in a respectively corresponding column. When a given hole 121 is located above one of the platen channels 130, the vacuum suction from the vacuum plenum 125 is communicated from the platen channel 130 (via one of the platen holes 127) to the given hole 121 and from the given hole 121 to the region above the given hole 121. If a print medium is located above the given hole 121, then the vacuum suction communicated through the given hole 121 generates a suction force on the print media that pulls the print media towards the movable support surface 120. If no print medium is located above the given hole 121, then the vacuum suction induces air from above the movable support surface 120 to flow down through the given hole 121 into the vacuum platen 126.

The platen holes 127 and platen channels 130 may be distributed across the body of the platen 126 in any desired arrangement. The spacings between the columns of platen channels 130 in the cross-process direction may be configured such that hold down suction can be applied to print media of a variety of sizes. In some embodiments, the spacings between columns of platen channels 130 are uniform, while in other embodiments the spacings may vary from one column to the next. The dimensions of the platen channels 130 may be any desired dimensions. In some embodiments, the platen channels 130 all extend in the process direction approximately the same length, while in other embodiments the platen channels 130 have varying lengths. In some embodiments, the lengths of the platen channels 130 in the process direction and the distances between adjacent holes 121 is such that multiple holes 121 can be located above the same platen channel 130 at the same time. In some embodiments, a width of the platen channels 130 in the cross-process direction (in regions other than the high impedance region) may be slightly larger than a diameter of the holes 121, to allow for a high degree of overlap between the holes 121 and the channel 130 as the holes 121 move over the channel 130 and to account for tolerances in the locations of the holes 121 and the channels 130. In some embodiments, multiple platen holes 127 are coupled to the same platen channel 130, in other embodiments one platen hole 127 is coupled to each platen channel 130, and in still other embodiments some platen channels 130 each have multiple platen holes 127 while other platen channels 130 each have just one platen hole 127.

In the printing system 100, at least some of the platen channels 130 comprise a high impedance region (also referred to herein as a "second region"), such as those described above. Each high impedance region is provided in a channel 130 at a location between one of the platen holes 127 that is coupled to the channel 130 and some other portion of the channel 130. The platen hole 127 that is adjacent to a given high impedance region may be referred to herein as being associated with the high impedance region. The high impedance region starts at a location upstream of, downstream of, or directly above the associated platen hole 127 and extends in the process direction away from the associated hole 127 some distance. The length of the high impedance region in the process direction is not limited. The portion of the channel adjacent to the high impedance region opposite from the associated platen hole 127 (also referred to herein as a suction portion or a "first region" of the channel 130), has an opening on a top side thereof (i.e., the side facing the movable support surface 120) and thus communicates vacuum suction from the associated hole 127 to the region of the platen 126 above the channel 130. In some embodiments, the high impedance region also has an opening on a top side thereof to communicate vacuum suction to the region above the platen 126, although in some embodiments a size of the opening may be reduced in the high impedance region as compared to the size of the opening in the suction portion of the channel 130. In other embodiments the high impedance region does not have an opening on the top side thereof. The high impedance region has a higher impedance than the rest of the channel, and thus reduces the rate at which air flows between the associated hole 127 and the suction portion of the channel 130, as compared to an airflow rate if the high impedance portion where absent. The reduction in the rate of airflow through the hole 127 caused by the high impedance region can reduce the strength of crossflows induced by the inter-media zone when the inter-media zone is located above the channel 130. With the crossflows reduced in strength, the ink droplets (including the satellite droplets) are more likely to land at or nearer to their intended deposition locations, and therefore the amount of blur near that edge of the print media is reduced.

In some embodiments, the higher impedance is obtained by reducing the open cross-sectional area of the channel in the high impedance region, as compared to the suction region. In some embodiments, a smaller open cross-sectional area in the high impedance region is obtained, at least in part, by necking-down the channel 130 in the high impedance region such that the total cross-sectional area of the channel 130 in the high impedance region is smaller than the total cross-sectional area of the channel 130 in the suction portion. In some embodiments, a necked-down portion of the channel 130 in the high impedance region may have a reduced width in the cross-process direction as compared to a width of the channel 130 in a suction portion. In an embodiment, the open cross-sectional area of the high impedance region is between around 33% to 66%, inclusive, of the open cross-sectional area of the suction portion. In an embodiment, the open cross-sectional area of the high impedance region is around 50% of the open cross-sectional area of the suction portion. In one embodiment, the channels 130 have a rectangular cross-sectional profile, and a width of the channel 130 in the cross-process in the high impedance region is smaller than a width of the channel 130 in a suction portion. In some embodiments, the high impedance region comprises obstruction features, as described above. In some embodiments, the high impedance region has both a reduced total cross-sectional area (as compared to other portions of the channel 130) and obstruction features disposed therein.

In some embodiments, the high impedance regions are provided at locations corresponding to platen holes 127 that are located near a printhead 110, as these are the places where high airflow is most likely to produce image blur. In some embodiments, the high impedance regions are provided at least for each platen hole 127 that is located under any printhead 110, immediately upstream of any printhead 110 (within some threshold distance), or immediately downstream of any printhead 110 (within some threshold distance). In some embodiments, some platen holes 127 may have multiple high impedance regions associated with them, such as a high impedance region immediately upstream of the respective platen hole 127 and a high impedance region immediately downstream of the respective platen hole 127. In some embodiments, high impedance regions are provided for additional platen holes 127, such as for every platen hole 127.

As noted above, the media loading/registration device 155 loads the print media onto the movable support surface 120 and registers the print media relative to various registration datums, as those of ordinary skill in the art are familiar with. For example, as each print medium is loaded onto the movable support surface 120, an edge of each print medium may be registered to (i.e., aligned with) a process-direction registration datum that extends in the process direction. Herein, whichever side of the media transport assembly 103 is closest to the process-direction registration datum is referred to as the outboard side of the media transport assembly 103 and the edge that is registered to this datum is referred to as the outboard edge, while the opposite side of the device is referred to as the inboard side and the opposite edge of the print medium is referred to as the inboard edge. In practice, the registration datum could be located on either side of the media transport assembly 103, and thus the side of the media transport assembly 103 that is considered the outboard side will vary from system to system (or from time to time within the same system) depending on which side the print media happen to be registered to. In addition, the lead and/or trail edges of the print media may be registered to various cross-process datums along the movable support surface 120 as the print media are loaded thereon. Thus, by registering each print medium to the process-direction registration datum and one of the cross-process registration datums, a precise location and orientation of the print medium relative to the movable support surface 120 may be enforced, thus allowing for accurate printing of images on the print medium. Various media loading/registration devices for loading print media onto a movable support surface and registering the print media relative to the movable support surface are known in the art and used in existing printing systems. Any existing media loading/registration device, or any new media loading/registration device, may be used as the media loading/registration device 155. Because the structure and function of such media loading/registration devices are well known in the art, further detailed description of such systems is omitted.

The control system 135 comprises processing circuitry to control operations of the printing system 100. The processing circuitry may include one or more electronic circuits configured with logic for performing the various operations described herein. The electronic circuits may be configured with logic to perform the operations by virtue of including dedicated hardware configured to perform various operations, by virtue of including software instructions executable by the circuitry to perform various operations, or any combination thereof. In examples in which the logic comprises software instructions, the electronic circuits of the processing circuitry include a memory device that stores the software and a processor comprising one or more processing devices capable of executing the instructions, such as, for example, a processor, a processor core, a central processing unit (CPU), a controller, a microcontroller, a system-on-chip (SoC), a digital signal processor (DSP), a graphics processing unit (GPU), etc. In examples in which the logic of the processing circuitry comprises dedicated hardware, in addition to or in lieu of the processor, the dedicated hardware may include any electronic device that is configured to perform specific operations, such as an Application Specific Integrated Circuit (ASIC), a Field Programmable Gate Array (FPGA), a Complex Programmable Logic Device (CPLD), discrete logic circuits, a hardware accelerator, a hardware encoder, etc. The processing circuitry may also include any combination of dedicated hardware and general-purpose processor with software.

Figure 3:
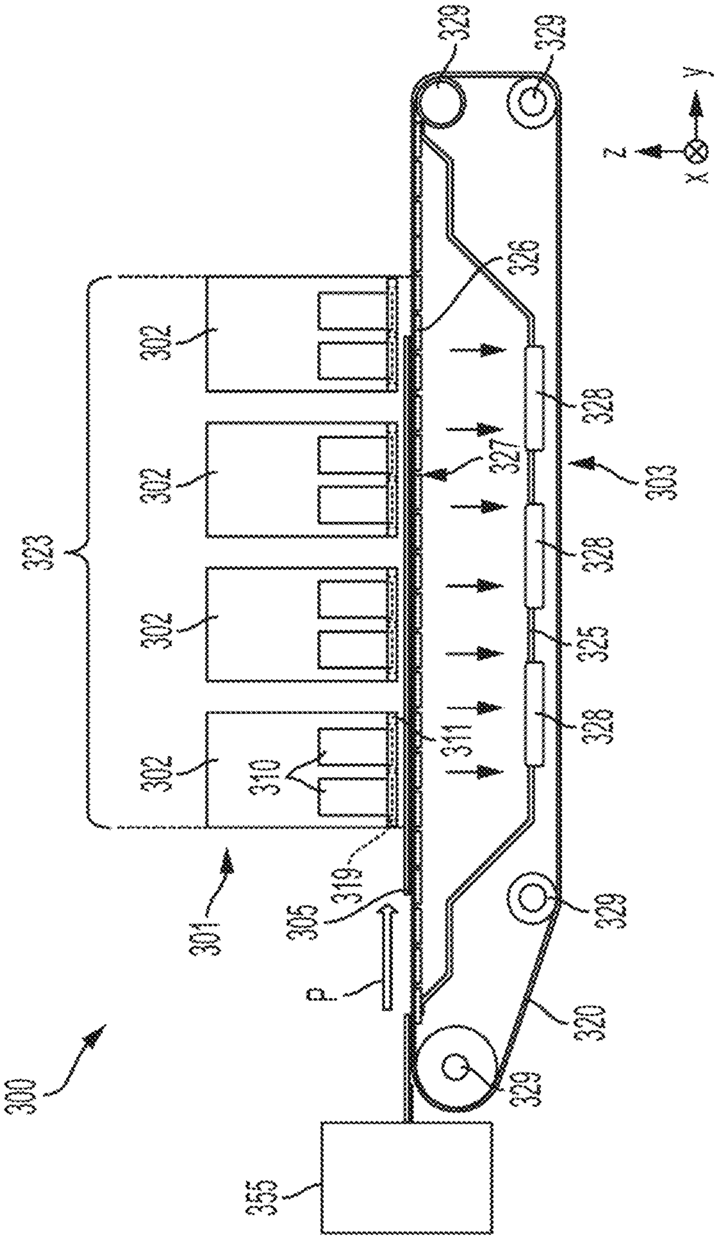
FIG. 3 is a schematic illustration of an ink deposition assembly and media transport assembly of one embodiment of an inkjet printing system.
Figure 4:
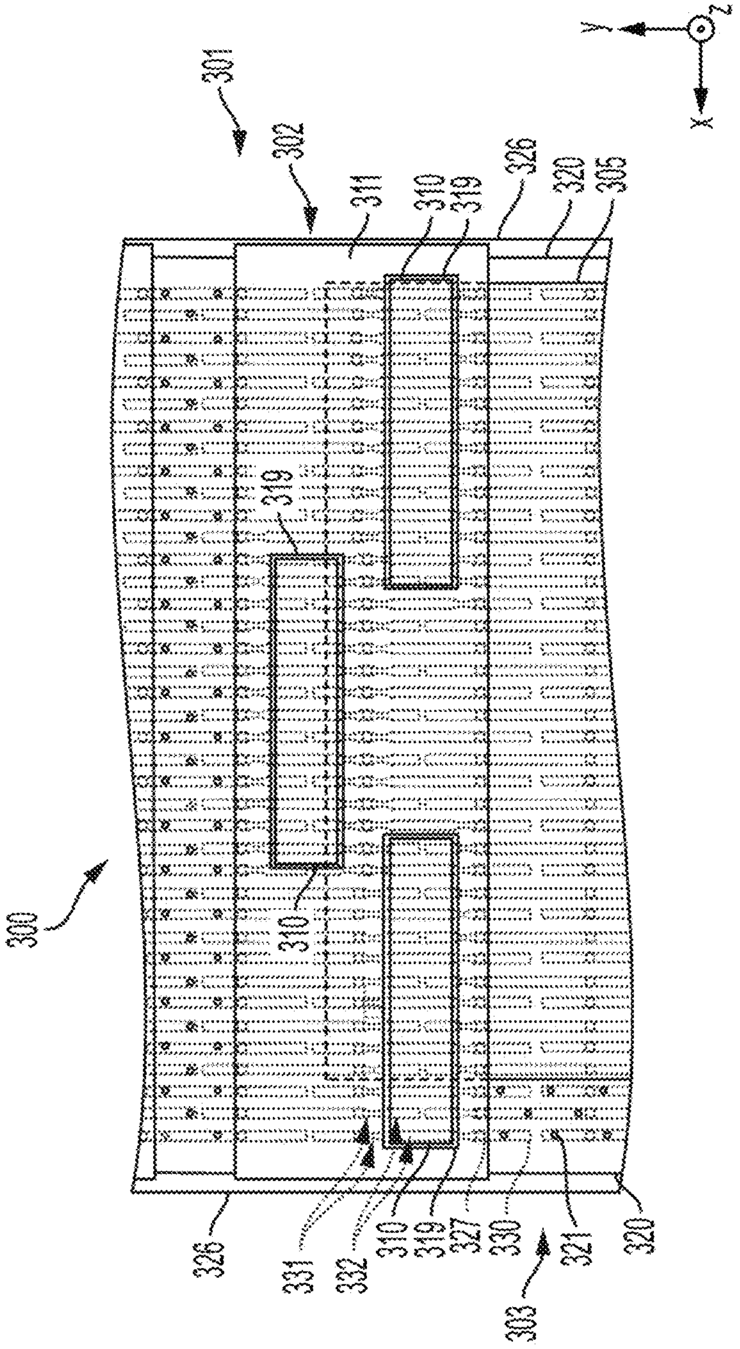
FIG. 4 is a plan view from above the inkjet printing system of FIG. 3.
Figure 5A:
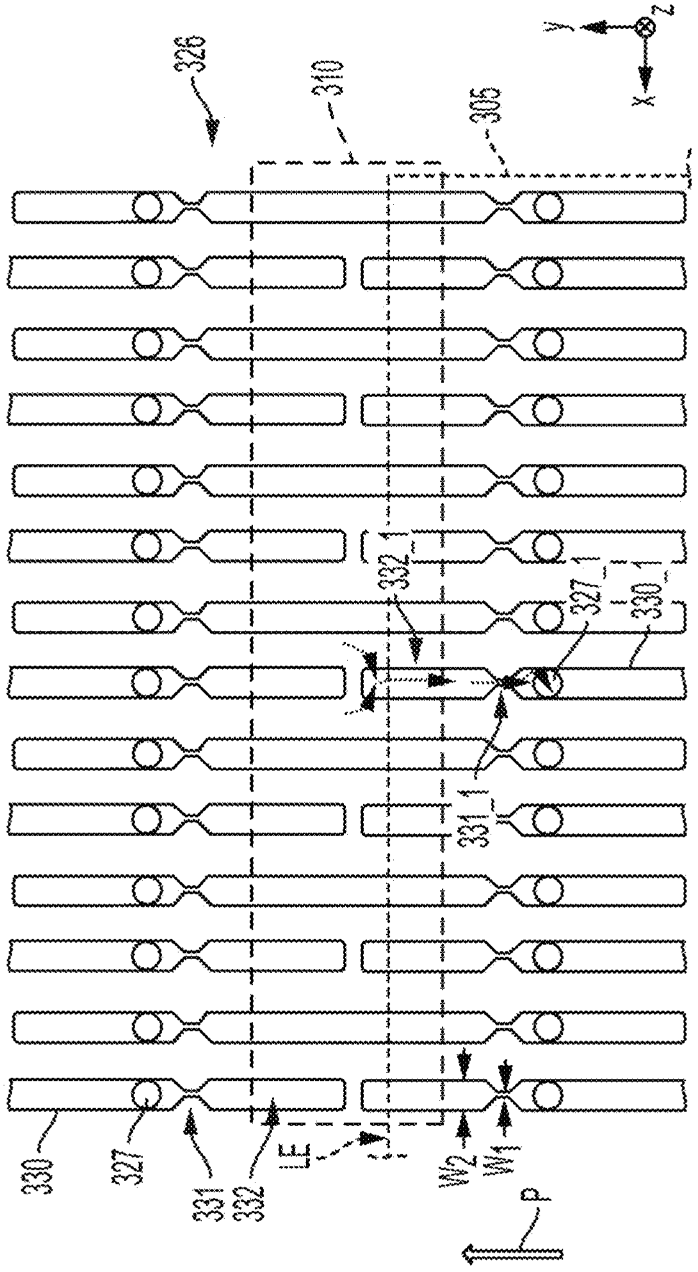
FIGS. 5A-5B are plan schematic views of channels of a vacuum platen of the inkjet printing system of FIGS. 3 and 4.
Figure 5B:
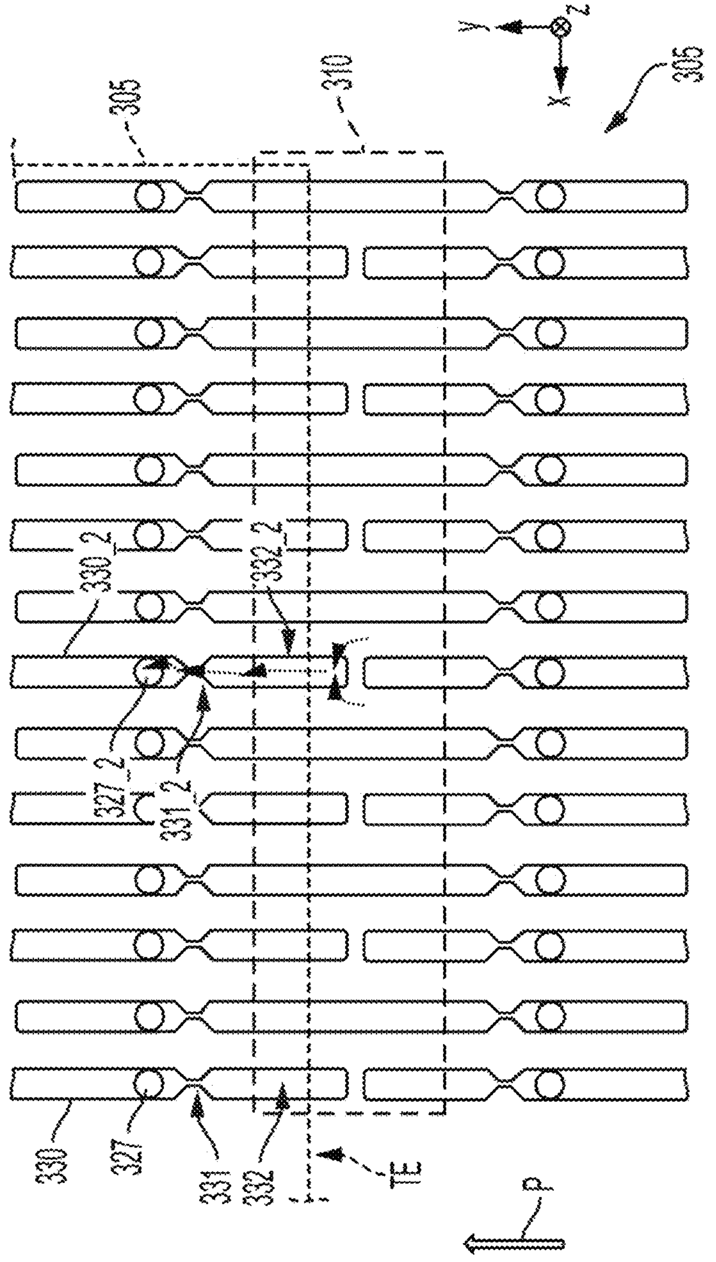
Figure 6:
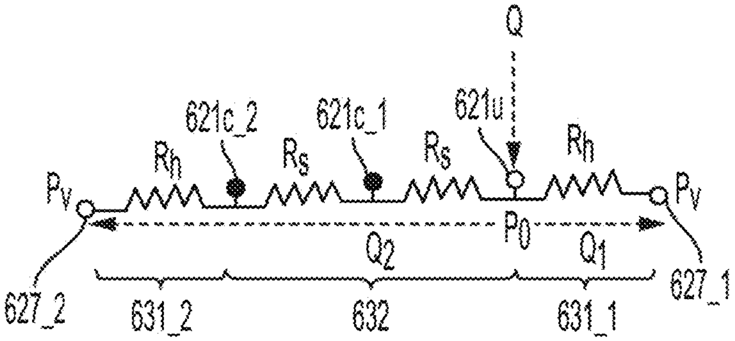
FIG. 6 is a diagram depicting exemplary impedances and airflow through a channel of the vacuum platen of the inkjet printing system of FIGS. 3 and 4.

Turning now to FIGS. 3-6, an embodiment of a printing system 300 will be described, which may be used as the printing system 100 described above with reference to FIG. 2. FIG. 3 comprises a schematic illustrating a portion of the printing system 300 from a side view. FIG. 4 comprises a plan view of a portion of the printing system 300 from above the media transport assembly 303. In FIG. 4, some components that would be hidden from view are illustrated in dashed lines. FIGS. 5A-5B comprise plan views of vacuum platen 326 of the printing system 300 from above the vacuum platen 326. In FIGS. 5A-5B, the movable support surface 320 and other components of the printing system 300 are omitted from the view to allow better visibility of the features of the platen 326, and an example location of one of the printheads 310 and a print medium 305 relative to the platen 326 are indicated by dashed lines. FIG. 6 is a schematic illustrating impedances of and airflow through one of the channels 330 of the printing system 300 in an example scenario.

As illustrated in FIG. 3, the printing system 300 comprises an ink deposition assembly 301 and a media transport assembly 303, which can be used as the ink deposition assembly 101 and media transport assembly 103, respectively, described above with reference to FIG. 2. The printing system 300 may also comprise additional components not illustrated in FIG. 3, such as a control system (e.g., similar to the control system 135).

In the printing system 300, the ink deposition assembly 301 comprises four printhead modules 302 as shown in FIG. 3, with each printhead module 302 having multiple printhead 310. The printhead models 302 are arranged in series along a process direction P above the media transport assembly 303, such that the print media 305 is transported sequentially beneath each of the printhead modules 302. The printheads 310 are arranged to eject print fluid (e.g., ink) through respectively corresponding printhead openings 319 in a corresponding carrier plate 311. In an embodiment, each printhead module 302 has three printheads 310 and the printheads 310 are arranged in an offset pattern with two printheads 310 being aligned within one another in the cross-process direction and the third printhead 310 being offset upstream or downstream from the other two printheads 310 (see FIG. 4). In other embodiments, different numbers and/or arrangements of printheads 310 and/or printhead modules 302 are used.

In the printing system 300, the movable support surface 320 of the media transport assembly 303 comprises a flexible belt. As shown in FIG. 3, the movable support surface 320 is driven by rollers 329 which move the movable support surface 320 along a looped path, with a portion of the path passing through an ink deposition region 323 of the ink deposition assembly 301. Additional rollers besides those illustrated may also be provided, such as one or more rollers to press the print media (a print medium 305 being shown in FIG. 3) against the movable support surface 320 when being loaded onto the movable support surface 320, one or more rollers to engage an outward facing surface of the movable support surface 320, and so on as would be familiar to those of ordinary skill in the art. The path that the movable support surface 320 takes in FIG. 3 is one non-limiting embodiment, and those of ordinary skill in the art would appreciate that various other paths are within the scope of the present disclosure. The media transport assembly 303 also comprises a media loading/registration device 355, which loads print media 305 onto the movable support surface 320 and registers the print media 305 relative to the movable support surface 320. The media loading/registration device 355 is similar to and may be used as the media loading/registration device 155 described above.

The movable support surface 320 comprises a number of holes 321 extending through the belt. The holes 321 are to communicate vacuum suction from below the belt (from the vacuum plenum 325, described further below) to the region above the belt to provide a vacuum suction force to hold the print media against the movable support surface 320. The holes 321 are arranged in a pattern across the movable support surface 320 so as to provide relatively even vacuum suction force to the print media and so as to accommodate various sizes of print media.

The vacuum plenum 325 comprises a vacuum platen 326, which forms a top wall of the plenum 325 and supports the movable support surface 320. The vacuum platen 326 may be used as the vacuum platen 126 described above. The vacuum platen 326 comprises a number of platen holes 327 distributed across the platen 326 which open to, and are fluidically coupled with, the interior of the vacuum plenum 325. The vacuum platen 326 also comprises a number of platen channels 330 which open to, and are fluidically coupled with, the region above the platen 326. Each platen channel 330 is fluidically coupled to one or more of the platen holes 327. For example, in the embodiment illustrated in FIG. 4, each platen channel 330 is fluidically coupled with two of the platen holes 327. Thus, each of the platen holes 327 and a corresponding one of the channels creates a passage through the vacuum platen 326 through which the vacuum suction from the vacuum plenum 325 is communicated to the movable support surface 320. The channels 330 are arranged in columns extending the process direction, and the columns are distributed across the platen 326 in the cross-process direction. Each of the holes 321 aligns with a column of the channels 330 such that each hole 321 sequentially moves over each of the channels 330 in the column as the movable supports surface 320 moves relative to the platen 326. When a given hole 321 is located above a given channel 330, the vacuum suction is communicated from the vacuum plenum 325 to the region above the movable support surface 320 via one of the holes 327 coupled to the given channel 330, the given channel 330, and the given hole 321.

With reference to FIGS. 4, 5A, and 5B, at least some of the platen channels 330 comprise high impedance regions (also referred to herein as "second regions") provided by necked-down portions 331 of the channels 330, as described above with respect to the platen channels 130. Each of the high impedance regions corresponds to one of the platen holes 327 and one of the suction portions 332 (also referred to herein as "first regions") of a channel 330, and is located between the corresponding platen hole 327 and suction portion 332. As shown in FIGS. 5A and 5B, in this embodiment the channels 330 comprise two necked-down portions 331 with the total cross-sectional area of the channels 330 being smaller in the necked-down portions 331 than in the remainder of the channels 330. The resulting impedance of the channel 330 depends on the size and geometry of the cross-sectional profile of both the necked-down portions 331 and the remainder of the channel 330, and thus a desired impedance for the channel 330 (and hence a desired airflow rate through the channel 330) may be obtained by controlling the relative areas and/or shapes of the cross-sections.

In an exemplary embodiment, as illustrated in FIGS. 5A and 5B, the channels 330 may have a rectangular or square cross-section with a width of the rectangle being in the cross-process direction and a height (or depth) perpendicular to the plane of the platen 326 (or in a Z-direction). In the necked-down portions 331, to achieve the smaller transverse cross-section, the width $w_1$ of the channel is less than the width $w_2$ in a remainder (non-necked down portions) of the channel 330. In some embodiments, $w_2/3 \leq w_1 \leq 2 \cdot w_2/3$. In some embodiments, $w_1 = 0.5 \cdot w_2$.

Airflow impedance (resistance) R through a given portion of the channel 330 can be determined by formula (1) below $$R = \frac{32\mu L}{D_h^2 A_c} \qquad (1)$$

where μ is the viscosity of the air, L is the length of the given portion of the channel (i.e., in the process direction), $D_h$ is the hydraulic diameter of the cross-section of the given portion of the channel 330, and $A_c$ is the total cross-sectional area of the given portion of the channel 330. In an embodiment in which the channels 330 have rectangular cross-sectional profiles, $D_h$ and $A_c$ are given by formulas (2) and (3) below $$D_h = \frac{2hw}{(w+h)} \tag{2}$$

$$A_c = wh \tag{3}$$

where h is the height of the channel and w is the width of the channel (i.e., in the cross-process direction). If an uncovered hole 321 is located above the channel 330, the rate of airflow Q through the hole 321 depends on the pressure differential ΔP between the pressure at the hole 321 ($P_0$) and the vacuum pressure ($P_v$), the impedances of the various portions of the channel 330, the position of the uncovered hole 321 relative to the channel 330, how many platen holes 127 are coupled to the channel 330 and their positions, and whether there are other uncovered holes 321 above the channel 330 and their positions.

In one scenario illustrated via a resistance diagram in FIG. 6, a movable support surface is positioned such that three of its holes 621 are located above a platen channel 630, including an uncovered holes 621*u* which is not covered by a print medium and two covered holes 621*c*_1 and 621*c*_2 that are covered by a print medium. The platen channel 630 is representative of any of the platen channels described herein, such as one of the platen channels 330 or 130. In this scenario, for purposes of illustration, the platen channel 630 is assumed to have two platen holes 627 (627_1 and 627_2) coupled thereto. The platen channel 630 also has two high-impedance regions labeled 631_1 and 631_2 with a suction portion 632 located therebetween. The high impedance regions 631 are representative of any of the high impedance regions described herein. In the scenario illustrated in FIG. 6, the uncovered holes 621*u* is located at an edge of the first high impedance portion 631_1. Thus, in this example scenario some of the airflow Q that flows down though the uncovered hole 621 into the channel 630 flows from the uncovered hole 621*u* through the first high-impedance portion 631_1 to the first of the holes 627_1 (see airflow $Q_1$), while some of the airflow Q flows through the suction portion 622 and the second high impedance portion 631_2 to the other hole 627_2 (see airflow $Q_2$). In such a state, the total rate of airflow Q though the uncovered hole 621 is approximated by formula (4)

$$Q = \frac{\Delta P \cdot 2(1+a)}{R_s(2+a)a} \tag{4}$$

where $R_s$ is the impedance (airflow resistance) through a segment of the suction portion 622 (it is assumed in this scenario that the air flows through two such segments when traversing the suction portion 622) and where a is the ratio of the impedance of one of the high impedance regions 631 ($R_h$) (it is assumed for convenience in this example that both high-impedance regions 631_1 and 631_2 have the same impedance, though this need not necessarily be the case) to the impedance of the segment of the suction portion 632 ($R_s$), i.e., $\alpha=R_h/R_s$. Thus, from formula (4) it can be seen that providing a high impedance region 631 with higher impedance than the suction portion 622 such that $\alpha>1$ results in a reduced flow rate of airflow Q.

Providing the high impedance regions 631 also tends to decrease the suction force applied to the print media, due to the reduced airflow rate. However, as described above, as the airflow is decreased due to the higher impedance of the high impedance region 631, the suction force decreases more slowly than the airflow rate does. The relatively slower rate of decline in suction force occurs, in part, because the size of the top opening in the suction portion 622 remains relatively large and therefore a greater area of the holes 621 is exposed to the vacuum suction in the channel 630. In contrast, if the entire channel 630 were narrowed, for example, to increase impedance, the portion of the holes 621 that is exposed to the suction in the channel 630 may decrease, and thus the suction force may also decrease even more than rapidly than it does in the embodiments disclosed herein. Because the hold down force decreases less rapidly than the airflow rate, there may exist one or more impedances of the high-impedance regions 631 that will yield a desired amount of reduction in airflow rate while still allowing for a sufficient hold down force to be applied. Turning again to the scenario illustrated in FIG. 6, the strength of suction force applied to the print media via the covered hole 621*c*_1 can be approximated by the formula (5) below $$F_1 = \frac{\beta}{2+a}\Delta P \tag{5}$$

The strength of suction force applied to the print media via the covered hole 621*c*_1 is approximated by the formula (6)

$$F_2 = \frac{2\beta}{2+a}\Delta P \tag{6}$$

where β is a constant of proportionality related to the dimensions of the covered holes 621*c*. Thus, in such an example, providing high impedance regions 630 with an impedance $R_h=1.5\cdot R_s$ (i.e., $\alpha=1.5$) reduces the airflow rate Q by around 30% but only reduces the total suction force (i.e., $F_1+F_2$) by about 15% (as compared to the state of $\alpha=1$). As another example, providing high impedance regions with an impedance $R_h=2\cdot R_s$ (i.e., $\alpha=2$) reduces the airflow rate Q by around 44% but only reduces the total suction force (i.e., $F_1+F_2$) by 25% (as compared to the state of $\alpha=1$). Thus, significant reductions in airflow rate can be obtained while still maintaining adequate hold down force. In one embodiment, the impedance of the high-impedance regions is set such that $\alpha=2$ which results in a reduction of the rate of airflow Q by 44% and a reduction in the hold down force by 25%. In other embodiments, the impedance of the high-impedance regions is set such that a is at least 1.5 which results in a reduction of the rate of airflow Q of at least 30% and a reduction in the hold down force by at least 15%. In some embodiments, the impedance of the high-impedance regions is set such that a is no more than 3 which results in a reduction of the rate of airflow Q of up to 60% and a reduction in the hold down force of up to 40%.

As shown in FIG. 4, in the printing system 300 the necked-down portions 331 are provided for each suction portion 332 that is located under or adjacent to a printhead 310, with the necked-down portions 331 located between the suction portion 332 and the platen hole 327 adjoining the suction portion 332. Thus, when the inter-media zone 322 is under the printhead 310, the necked-down portion 331 reduces the rate of airflow through the suction portion 332 that is under or adjacent to the printhead 310, thus reducing the strength of crossflows. In some embodiments, such as the embodiment illustrated in FIG. 4, the necked down portions 331 are not provided for suction portions 332 that are more distant from the printheads 310, as the distance of these suction portions 332 from the ink deposition regions of the printheads 310 results in the suction through these suction portions 332 contributing less to the strength of crossflows. In other embodiments (not illustrated), the necked down portion 331 can be provided for other pairs of suction portions and platen holes 327. For example, in some embodiments a necked down portion 331 is provided for each pair of platen hole 327 and adjoining suction portions 332.

As described above, providing the necked down portions 331 at least near the printhead 310 can reduce the strength of crossflows and thus reduce the amount of image blur that occurs near the lead edge and trail edge of the print media. For example, FIG. 5A illustrates a state in which a lead edge LE of a print medium 305 is located under a printhead 310. In such a state, air will be pulled down through those channels 330 under the printhead 310 which are not fully covered by the print medium 305. For example, the channel 330_1 illustrated in FIG. 5A is mostly covered by the print medium 305, except that a downstream part of the suction portion 332_1 is uncovered. Thus, the vacuum suction communicated through the channel 330_1 will tend to such in air from under the printhead 310 through the uncovered part of the suction portion 332_1, and this air will then flow under upstream the print medium 305 inside the channel 330_1, passing through the necked down portion 331_1 and ultimately through the platen hole 327_1, as indicated by the dash-lined arrows in FIG. 5A. Similarly, air will flow from under the printhead 310 into the portions of the other channels 330 that are not covered by the print medium 305. Due to the proximity of these uncovered portions the channels 330 to the ink deposition regions of the printhead 310, the airflows induced through these channels 330 will include some crossflows that pass through the deposition region and thus produce image blur near the lead edge LE, as explained above with respect to the similar state illustrated in FIG. 1D. However, because the necked down portions 331 of these channels 330 cause relatively high impedances, the flow rate of these airflows is significantly reduced as compared to the state illustrated in FIG. 1D, and therefore the strength of the crossflows and hence the amount of image blur near the lead edge LE are reduced.

FIG. 5B illustrates the same phenomena, except this time near the trail edge TE of the print media 305. In this case, the air is pulled into the channel 330_2 through the uncovered part of the suction portion 332_2 of the channel 330_2, and then the air flows downstream through the channel 330_2 under the print medium 305 to the platen hole 327_2, passing through the necked down portion 331_2 on the way. Similar airflow is induced in the other uncovered channel 330. Due to the proximity of these uncovered portions the channels 330 to the ink deposition regions of the printhead 310, the airflows induced through these channels 330 will include some crossflows that pass through the deposition region and thus produce image blur near the trail edge TE, as described above with respect to FIG. 1A. However, because the necked down portion 331 causes relatively high impedances, the flow rate of these airflows is significantly reduced as compared to the state illustrated in FIG. 1A, and therefore the strength of the crossflows and the amount of image blur near the trail edge TE are reduced.

While in the embodiments of FIGS. 4, 5A, and 5B, the high impedance regions of the channels comprised necked down portions of the channels, in other embodiments the high impedance region may be formed by adding obstruction features in the channel, in addition to or in lieu of the necked down portions, as described above. Such obstruction features would be selected so as to restrict airflow, and thus increase the airflow impedance, passing through the region of the channel in which such obstruction feature is located, as compared to remaining portions of the channel that do not having such obstruction features. The resulting high impedance regions may be used as the high impedance regions of the printing system 100, and/or as the high impedance regions of the printing system 300 (replacing or supplementing the necked down portions 331). In particular, FIGS. 7A-12B illustrate various embodiments of platens in which the high impedance regions are provided by obstruction features within the platen channels. The platens (and the high impedance regions) of FIGS. 7A-12B may be used as the platen 126 described above.

Figure 7B:
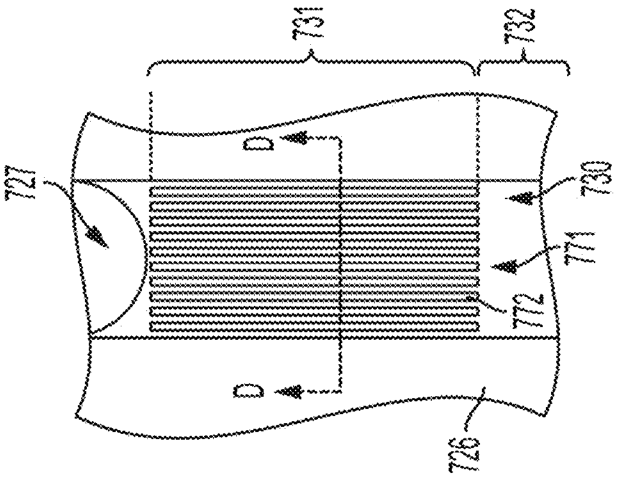
FIG. 7B is a plan view of the platen of FIG. 7A.
Figure 7A:
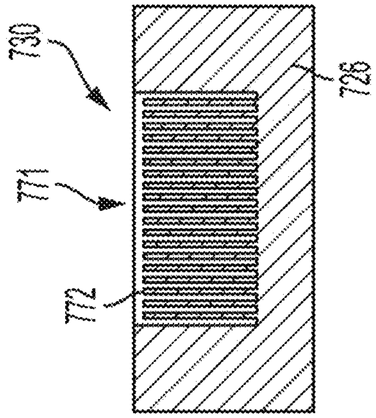
FIG. 7A is a cross-section of an embodiment of a platen with a channel having a high impedance region, with the section taken along D in FIG. 7B.

FIGS. 7A and 7B illustrate an embodiment of a platen 726 comprising a channel 730 in which the high impedance region 731 is formed by providing a fin array 771 as the obstruction features within a portion of the channel 730. FIG. 7B illustrates a plan view of a portion of the platen 726, and FIG. 7A is a cross-section taken along D in FIG. 7B. The fin array 771 comprises a number fins 772 that extend roughly parallel to a longitudinal dimension of the channel 730. The fins 772 comprise relatively thin plate-like structures, which are positioned parallel to one another. The fins 772 may be integrally connected to platen 726 (e.g., skived fins machined into the platen 726), or they may be formed separately from and then later coupled to the platen 726. The impedance may be controlled to a desired level by adjusting the dimensions of the fins 772 (shortening the fins 772 in the longitudinal and/or height dimensions reducing the impedance, and vice versa) and/or by adjusting the number of and spacing between the fins 772 (increasing the number and density of fins 772 increasing the impedance, and vice versa). The dimensions of the fins 772, the spacing between the fins 772, and the number of fins 772 that are provided are not limited. As shown in FIG. 7B, the fin array 771 of the high impedance region 731 is located between a platen hole 727 and another portion 732 of the channel 730. In some embodiments, the fin array 771 is located adjacent to and upstream or downstream of the platen hole 727, as shown in FIG. 7B.

Figure 8A:
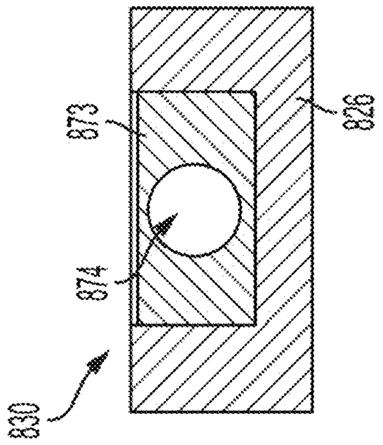
FIG. 8A is a cross-section of an embodiment of a platen with a channel having a high impedance region, with the section taken along E in FIG. 8B.
Figure 8B:
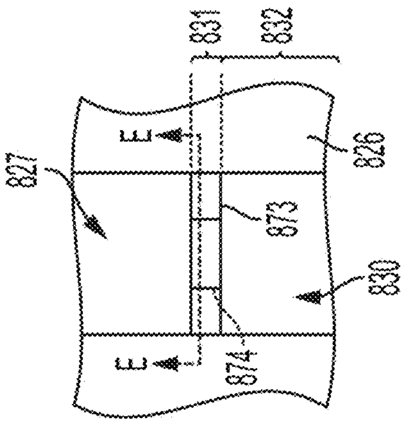
FIG. 8B is a plan view of the platen of FIG. 8A.

FIGS. 8A and 8B illustrate an embodiment of a platen 826 comprising a channel 830 in which the high impedance region 831 is formed by providing a wall 873 with an aperture 874 as the obstruction features within a portion of the channel 830. FIG. 8B illustrates a plan view of a portion of the platen 826, and FIG. 8A is a cross-section taken along E in FIG. 8B. Although only one aperture 874 is illustrated for simplicity, any number of aperture 874 may be provided. The impedance may be controlled to a desired level by adjusting the number and/or dimensions of the aperture(s) 874. The wall 873 may be integrally connected to platen 826 (e.g., it may be machined into the platen 826), or the wall 873 may be formed separately from and then later coupled to the platen 826. The aperture(s) 874 may be any size and shape and may be located anywhere in the wall 873. As shown in FIG. 8B, the wall 873 of the high impedance region 831 is located between a platen hole 827 and another portion 832 of the channel 830. In some embodiments, the wall 873 is located adjacent to and upstream or downstream of the platen hole 827, as shown in FIG. 8B. In some embodiments (not illustrated), the wall 873 of the high impedance region 831 is located above the platen holes 827, in which case an orientation of the wall 873 may be horizontal rather than vertical.

Figure 9B:
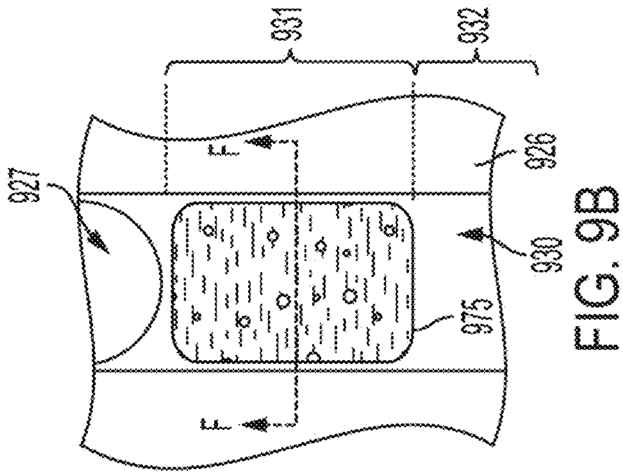
FIG. 9B is a plan view of the platen of FIG. 9A.
Figure 9A:
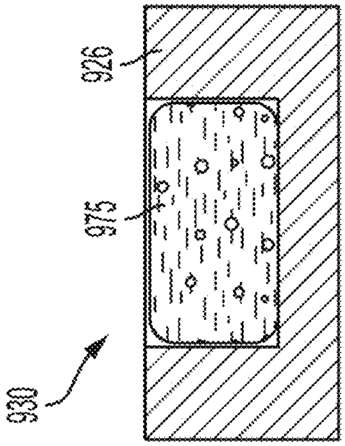
FIG. 9A is a cross-section of an embodiment of a platen with a channel having a high impedance region, with the section taken along F in FIG. 9B.

FIGS. 9A and 9B illustrate an embodiment of a platen 926 comprising a channel 930 in which the high impedance region 931 is formed by providing a porous material 975 as the obstruction features within a portion of the channel 930. FIG. 9B illustrates a plan view of a portion of the platen 926, and FIG. 9A is a cross-section taken along F in FIG. 9B. The porous material 975 may comprise any type of porous material, with non-limiting examples including a sponge, a fabric, a filter, foam, steel wool, etc. The impedance may be controlled to a desired level by changing the type of porous material 975 that is used and/or by changing the dimensions of the porous material 975 (extending the porous material 975 further in the longitudinal direction increasing the impedance, and vice versa). The dimensions of the porous material 975 are not limited, with the illustrated dimensions being just one non-limiting example. As shown in FIG. 9B, the porous material 975 of the high impedance region 931 is located between a platen hole 927 and another portion 932 of the channel 930. In some embodiments, the porous material 975 is located adjacent to and upstream or downstream of the platen hole 927, as shown in FIG. 9B. In some embodiments (not illustrated), the porous material 975 of the high impedance region 931 is located above the platen holes 927.

Figure 10B:
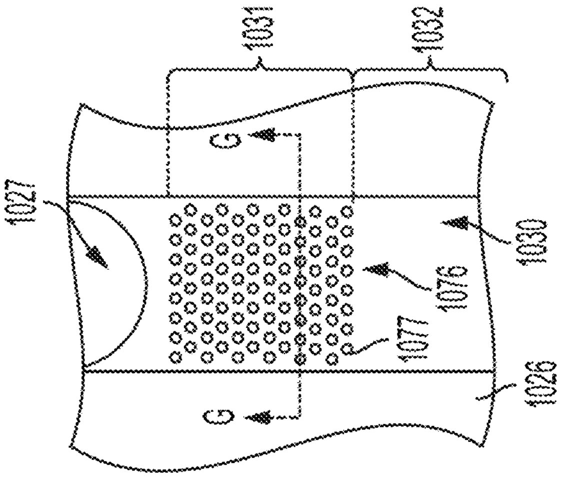
FIG. 10B is a plan view of the platen of FIG. 10A.
Figure 10A:
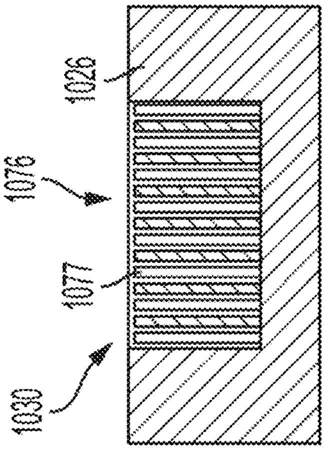
FIG. 10A is a cross-section of an embodiment of a platen with a channel having a high impedance region, with the section taken along G in FIG. 10B.

FIGS. 10A and 10B illustrate an embodiment of a platen 1026 comprising a channel 1030 in which the high impedance region 1031 is formed by providing a pin array 1076 as the obstruction features within a portion of the channel 1030. FIG. 10B illustrates a plan view of a portion of the platen 1026, and FIG. 10A is a cross-section taken along F in FIG. 10B. The pin array 1076 comprises a number of pins 1077 which are arranged in an array. The pins 1077 comprise columnar structures which extend vertically (i.e., along a height or depth dimension of the channel 1030). The pins 1077 may be integrally connected to platen 1026 (e.g., they may be machined into the platen 1026), or they may be formed separately from and then later coupled to the platen 1026. The impedance may be controlled to a desired level by adjusting the dimensions of the pins 1077 (reducing the diameter of the pins 1077 or shortening the pins in the height/depth dimension reducing the impedance, and vice versa) and/or by adjusting the number of and spacing between the pins 1077 (increasing the number and density of pins 1077 increasing the impedance, and vice versa). The dimensions of the pins 1077, the spacing between the pins 1077, and the number of pins 1077 that are provided are not limited. As shown in FIG. 10B, the pin array 1076 of the high impedance region 1031 is located between a platen hole 1027 and another portion 1032 of the channel 1030. In some embodiments, the pin array 1076 is located adjacent to and upstream or downstream of the platen hole 1027, as shown in FIG. 10B.

Figure 11B:
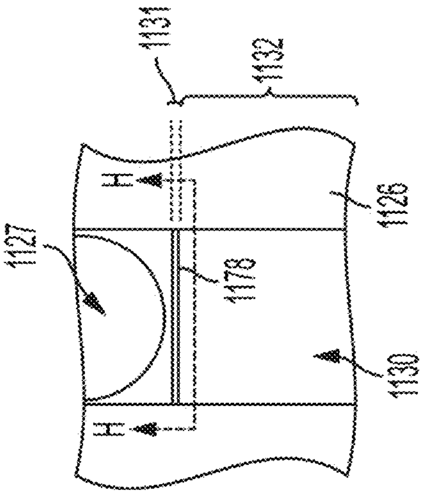
FIG. 11B is a plan view of the platen of FIG. 11A.
Figure 11A:
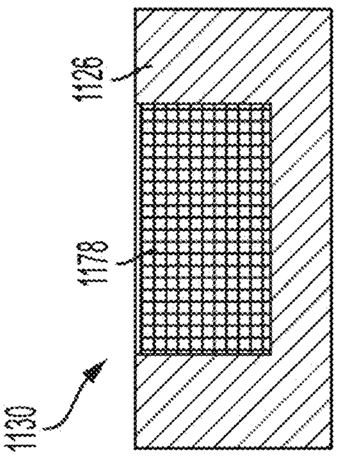
FIG. 11A is a cross-section of an embodiment of a platen with a channel having a high impedance region, with the section taken along H in FIG. 11B.

FIGS. 11A and 11B illustrate an embodiment of a platen 1126 comprising a channel 1130 in which the high impedance region 1131 is formed by providing one or more mesh screens 1178 as the obstruction features within a portion of the channel 1130. FIG. 11B illustrates a plan view of a portion of the platen 1126, and FIG. 11A is a cross-section taken along F in FIG. 11B. The mesh screen 1178 may comprise any type of mesh, such as a wire mesh, a fiber mesh, etc. The impedance may be controlled to a desired level by changing the size of openings in the mesh screen 1178 and/or by changing a number of mesh screens 1178 that are provided. The dimensions and numbers of the mesh screen 1178 are not limited. As shown in FIG. 11B, the mesh screen 1178 of the high impedance region 1131 is located between a platen hole 1127 and another portion 1132 of the channel 1130. In some embodiments, the mesh screen 1178 is located adjacent to and upstream or downstream of the platen hole 1127, as shown in FIG. 11B. In some embodiments (not illustrated), the mesh screen 1178 is located above the platen hole 1127, in which case an orientation of the mesh screen 1178 may be horizontal rather than vertical such that the mesh screen 1178 covers the platen hole 1127.

Figure 12B:
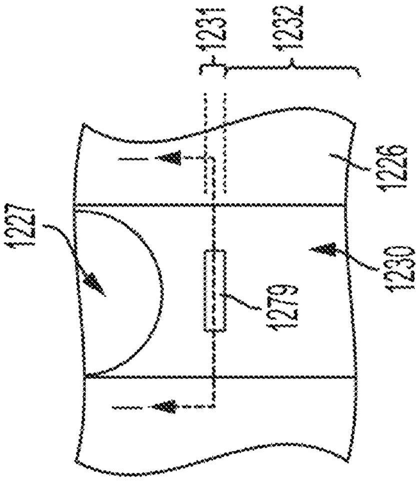
FIG. 12B is a plan view of the platen of FIG. 12A.
Figure 12A:
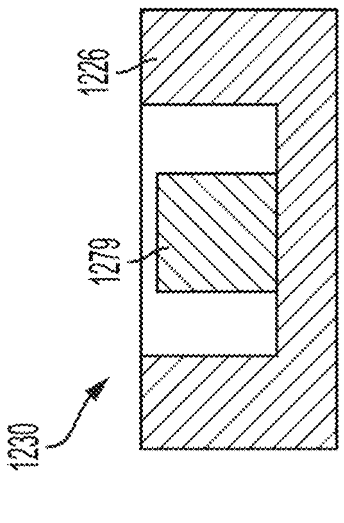
FIG. 12A is a cross-section of an embodiment of a platen with a channel having a high impedance region, with the section taken along I in FIG. 12B.

FIGS. 12A and 12B illustrate an embodiment of a platen 1226 comprising a channel 1230 in which the high impedance region 1231 is formed by providing one or more baffles 1279 as the obstruction features within a portion of the channel 1230. FIG. 12B illustrates a plan view of a portion of the platen 1226, and FIG. 12A is a cross-section taken along F in FIG. 12B. The baffle(s) 1279 may comprise any solid object that blocks airflow, such as a piece of metal, plastic, polymer, silicone, or any other desired object. The baffle(s) 1279 may be integrally connected to platen 1226 (e.g., they may be machined into the platen 1226), or they may be formed separately from and then later coupled to the platen 1226. In some embodiments, multiple baffles 1279 are provided and they are arranged in an array. The impedance through the region 1231 may be controlled to a desired level by changing the dimensions and numbers of baffles 1279 that are provided. The dimensions and numbers of the baffles 1279 are not limited. As shown in FIG. 12B, the high impedance region 1231 is located between a platen hole 1227 and another portion 1232 of the channel 1230. In some embodiments, the baffles 1279 are located adjacent to and upstream or downstream of the platen hole 1227, as shown in FIG. 12B.

This description and the accompanying drawings that illustrate inventive aspects and embodiments should not be taken as limiting—the claims define the protected invention. Various mechanical, compositional, structural, electrical, and operational changes may be made without departing from the spirit and scope of this description and the claims. In some instances, well-known circuits, structures, and techniques have not been shown or described in detail in order not to obscure the invention. Like numbers in two or more figures represent the same or similar elements.

Further, the terminology used herein to describe aspects of the invention, such as spatial and relational terms, is chosen to aid the reader in understanding embodiments of the invention but is not intended to limit the invention. For example, spatially terms—such as "beneath", "below", "lower", "above", "upper", "inboard", "outboard", "up", "down", and the like—may be used herein to describe directions or one element's or feature's spatial relationship to another element or feature as illustrated in the figures. These spatial terms are used relative to the poses illustrated in the figures, and are not limited to a particular reference frame in the real world. Thus, for example, the direction "up" in the figures does not necessarily have to correspond to an "up" in a world reference frame (e.g., away from the Earth's surface). Furthermore, if a different reference frame is considered than the one illustrated in the figures, then the spatial terms used herein may need to be interpreted differently in that different reference frame. For example, the direction referred to as "up" in relation to one of the figures may correspond to a direction that is called "down" in relation to a different reference frame that is rotated 180 degrees from the figure's reference frame. As another example, if a device is turned over 180 degrees in a world reference frame as compared to how it was illustrated in the figures, then an item described herein as being "above" or "over" a second item in relation to the Figures would be "below" or "beneath" the second item in relation to the world reference frame. Thus, the same spatial relationship or direction can be described using different spatial terms depending on which reference frame is being considered. Moreover, the poses of items illustrated in the figure are chosen for convenience of illustration and description, but in an implementation in practice the items may be posed differently.

The term "process direction" refers to a direction that is parallel to and pointed in the same direction as an axis along which the print media moves as is transported through the deposition region of the ink deposition assembly. Thus, the process direction is a direction parallel to the y-axis in the Figures and pointing in a positive y-axis direction.

The term "cross-process direction" refers to a direction perpendicular to the process direction and parallel to the movable support surface. At any given point, there are two cross-process directions pointing in opposite directions, i.e., an "inboard" cross-process direction and an "outboard" cross-process direction. Thus, considering the reference frames illustrated in the Figures, a cross-process direction is any direction parallel to the x-axis, including directions pointing in a positive or negative direction along the x-axis. References herein to a "cross-process direction" should be understood as referring generally to any of the cross-process directions, rather than to one specific cross-process direction, unless indicated otherwise by the context. Thus, for example, the statement "the valve is movable in a cross-process direction" means that the valve can move in an inboard direction, outboard direction, or both directions.

The terms "upstream" and "downstream" may refer to directions parallel to a process direction, with "downstream" referring to a direction pointing in the same direction as the process direction (i.e., the direction the print media are transported through the ink deposition assembly) and "upstream" referring to a direction pointing opposite the process direction. In the Figures, "upstream" corresponds to a negative y-axis direction, while "downstream" corresponds to a positive y-axis direction. The terms "upstream" and "downstream" may also be used to refer to a relative location of element, with an "upstream" element being displaced in an upstream direction relative to a reference point and a "downstream" element being displaced in a downstream direction relative to a reference point. In other words, an "upstream" element is closer to the beginning of the path the print media takes as it is transported through the ink deposition assembly (e.g., the location where the print media joins the movable support surface) than is some other reference element. Conversely, a "downstream" element is closer to the end of the path (e.g., the location where the print media leaves the support surface) than is some other reference element. The reference point of the other element to which the "upstream" or "downstream" element is compared may be explicitly stated (e.g., "an upstream side of a printhead"), or it may be inferred from the context.

The terms "inboard" and "outboard" refer to cross-process directions, with "inboard" referring to one to cross-process direction and "outboard" referring to a cross-process direction opposite to "inboard." In the Figures, "inboard" corresponds to a positive x-axis direction, while "outboard" corresponds to a negative x-axis direction. The terms "inboard" and "outboard" also refer to relative locations, with an "inboard" element being displaced in an inboard direction relative to a reference point and with an "outboard" element being displaced in an outboard direction relative to a reference point. The reference point may be explicitly stated (e.g., "an inboard side of a printhead"), or it may be inferred from the context.

The term "vertical" refers to a direction perpendicular to the movable support surface in the deposition region. At any given point, there are two vertical directions pointing in opposite directions, i.e., an "upward" direction and an "downward" direction. Thus, considering the reference frames illustrated in the Figures, a vertical direction is any direction parallel to the z-axis, including directions pointing in a positive z-axis direction ("up") or negative z-axis direction ("down").

The term "horizontal" refers to a direction parallel to the movable support surface in the deposition region (or tangent to the movable support surface in the deposition region, if the movable support surface is not flat in the deposition region). Horizontal directions include the process direction and cross-process directions.

The term "vacuum" has various meanings in various contexts, ranging from a strict meaning of a space devoid of all matter to a more generic meaning of a relatively low pressure state. Herein, the term "vacuum" is used in the generic sense, and should be understood as referring broadly to a state or environment in which the air pressure is lower than that of some reference pressure, such as ambient or atmospheric pressure. The amount by which the pressure of the vacuum environment should be lower than that of the reference pressure to be considered a "vacuum" is not limited and may be a small amount or a large amount. Thus, "vacuum" as used herein may include, but is not limited to, states that might be considered a "vacuum" under stricter senses of the term.

The term "air" has various meanings in various contexts, ranging from a strict meaning of the atmosphere of the Earth (or a mixture of gases whose composition is similar to that of the atmosphere of the Earth), to a more generic meaning of any gas or mixture of gases. Herein, the term "air" is used in the generic sense, and should be understood as referring broadly to any gas or mixture of gases. This may include, but is not limited to, the atmosphere of the Earth, an inert gas such as one of the Noble gases (e.g., Helium, Neon, Argon, etc.), Nitrogen ($N_2$) gas, or any other desired gas or mixture of gases.

In addition, the singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the inventions disclosed herein. It is intended that the specification and embodiments be considered as exemplary only, with the following claims being entitled to their fullest breadth, including equivalents, under the applicable law.

What is claimed is:

1. A printing system, comprising:

an ink deposition assembly comprising a printhead arranged to eject a print fluid to a deposition region of the ink deposition assembly; and a media transport assembly comprising:

a vacuum source, a vacuum platen comprising platen holes fluidically coupled to corresponding platen channels, and a movable support surface movable in a process direction, wherein the media transport assembly is configured to hold a print medium against the movable support surface by vacuum suction communicated from the vacuum source through the platen holes and platen channels to transport the print medium through the deposition region, and wherein at least some of the platen channels comprise a first region and a second region having a reduced open cross-sectional area relative to the first region, the second region being at a location between the first region and a platen hole fluidically coupled to the respective platen channel, wherein the second region of a given platen channel of the at least some platen channels comprises an obstruction feature located in the given platen channel, and wherein the obstruction feature comprises one or more of a fin array, a pin array, a mesh, a porous material, a wall with an aperture, a baffle, or any combination thereof.

2. The printing system of claim 1, wherein each of the platen channels has a length extending in the process direction.

3. The printing system of claim 1, wherein each of the platen channels is fluidically coupled to multiple of the platen holes.

4. The printing system of claim 1, wherein the at least some platen channels are channels that are under the printhead.

5. The printing system of claim 1, wherein the movable support surface comprises a belt configured to move over a surface of the vacuum platen, the belt comprising belt holes through which the vacuum suction is communicated to the print medium.

6. A The printing system comprising: of claim 1, an ink deposition assembly comprising a printhead arranged to eject a print fluid to a deposition region of the ink deposition assembly; and a media transport assembly comprising:

a vacuum source, a vacuum platen comprising platen holes fluidically coupled to corresponding platen channels, and a movable support surface movable in a process direction, wherein the media transport assembly is configured to hold a print medium against the movable support surface by vacuum suction communicated from the vacuum source through the platen holes and platen channels to transport the print medium through the deposition region, and wherein at least some of the platen channels comprise a first region and a second region having a reduced open cross-sectional area relative to the first region, the second region being at a location between the first region and a platen hole fluidically coupled to the respective platen channel, wherein the second region of a given platen channel of the at least some platen channels comprises a necked down portion of the given platen channel.

7. The printing system of claim 6, wherein each of the platen channels has a length extending in the process direction.

8. The printing system of claim 6, wherein each of the platen channels is fluidically coupled to multiple of the platen holes.

9. The printing system of claim 6, wherein the at least some platen channels are channels that are under the printhead.

10. A vacuum platen for a media transport device of a printing system, comprising:

a platen body;

a plurality of platen channels in the platen body, each of the platen channels opening to a first side of the platen body; and a plurality of platen holes in the platen body, each the platen holes opening to a second side of the platen body, opposite the first side, and being fluidically coupled to one of the platen channels, wherein at least some of the platen channels comprise a first region and a second region having a reduced open cross-sectional area relative to the first region, the second region being at a location between the first region and a platen hole fluidically coupled to the respective platen channel, wherein the second region of a given platen channel of the at least some platen channels comprises an obstruction feature located in the given platen channel, and wherein the obstruction feature comprises one or more of a fin array, a pin array, a mesh, a porous material, a wall with an aperture, a baffle, or any combination thereof.

11. The vacuum platen of claim 10, wherein the platen channels each has a length extending in a direction parallel to a longitudinal dimension of the vacuum platen.

12. The vacuum platen of claim 10, wherein each of the platen channels is fluidically coupled to multiple of the platen holes.

13. The vacuum platen of claim 10, wherein the at least some platen channels are positioned so as to be located under a printhead of a printing system on condition of the vacuum platen being installed in the printing system.

14. A method, comprising:

loading a print medium onto a movable support surface of a media transport assembly of a printing system;

holding the print medium against the movable support surface via vacuum suction through platen holes and platen channels in a vacuum platen, flowing air from a first region of a given platen channel of the platen channels through a second region of the given platen channel to one of the platen holes, an open cross-sectional area of the second region being reduced relative to the first region;

transporting the print medium, by moving the movable support surface relative to the vacuum platen, in a process direction through a deposition region of a printhead of the printing system; and ejecting print fluid from the printhead to deposit the print fluid to the print medium in the deposition region, wherein the second region of the given platen channel of the at least some platen channels comprises an obstruction feature located in the given platen channel, and wherein the obstruction feature comprises one or more of a fin array, a pin array, a mesh, a porous material, a wall with an aperture, a baffle, or any combination thereof.

15. The method of claim 14, wherein the given platen channel is located under the printhead.

16. The method of claim 14, wherein each of the platen channels has a length extending in the process direction.

17. The method of claim 14, wherein each of the platen channels is fluidically coupled to multiple of the platen holes.

* * * * *